United States Patent
Omiya et al.

(10) Patent No.: US 7,137,880 B2
(45) Date of Patent: Nov. 21, 2006

(54) VENTILATION DUCT FOR VEHICLES

(75) Inventors: Yoshimasa Omiya, Aichi-ken (JP);
Daiichiro Kawashima, Aichi-ken (JP);
Yasunobu Teramoto, Aichi-ken (JP);
Yoshikazu Hirose, Aichi-ken (JP);
Tomokazu Inoue, Aichi-ken (JP)

(73) Assignee: Toyoda Gosei Co., Ltd., Aichen-ken (JP)

( * ) Notice: Subject to any disclaimer, the term of this patent is extended or adjusted under 35 U.S.C. 154(b) by 167 days.

(21) Appl. No.: 10/911,638

(22) Filed: Aug. 5, 2004

(65) Prior Publication Data

US 2005/0075064 A1  Apr. 7, 2005

(30) Foreign Application Priority Data

Aug. 7, 2003  (JP) ............................ 2003-289296
Nov. 21, 2003 (JP) ............................ 2003-392618
Feb. 17, 2004 (JP) ............................ 2004-040124

(51) Int. Cl.
*G60H 1/24* (2006.01)

(52) U.S. Cl. ..................................... 454/162; 454/906
(58) Field of Classification Search ............... 454/162, 454/164, 165, 906
See application file for complete search history.

(56) References Cited

U.S. PATENT DOCUMENTS 5,167,574 A * 12/1992 Ikeda et al. ................. 454/164
6,210,266 B1 * 4/2001 Barton ........................ 454/162
6,565,429 B1 * 5/2003 Broberg ...................... 454/306
6,866,576 B1 * 3/2005 Quinn et al. ................. 454/162
2005/0000680 A1 * 1/2005 Hiraishi et al. ............... 165/42

FOREIGN PATENT DOCUMENTS

| JP | A-2001-130447 | 5/2001 |
| JP | A-2002-172927 | 6/2002 |
| JP | A-2003-182344 | 7/2003 |

* cited by examiner

*Primary Examiner*—Gregory Wilson
(74) *Attorney, Agent, or Firm*—Posz Law Group, PLC (57) ABSTRACT

A vehicle ventilation duct includes a duct body, a conduit, a sound absorption chamber, a transmission opening communicating the conduit with the sound absorption chamber, and an air-permeable member closing the transmission opening permeably. The duct body is disposed in a vehicle outer hull, and includes a frame having a ventilation opening opened to the outside of a vehicle and a valve element covering the ventilation opening openably and closably. The conduit is formed integrally with or independently of the duct body, is disposed on a vehicle-passenger-room side of the duct body, is communicated with the ventilation opening of the duct body, and is communicated with the inside of a vehicle passenger room, whereby enabling air inside and outside the vehicle to pass therethrough back and forth. Thus, the ventilation duct lets out air in the vehicle passenger room to the outside of the vehicle or vice versa.

4 Claims, 8 Drawing Sheets

(Prior Art)

VENTILATION DUCT FOR VEHICLES

BACKGROUND OF THE INVENTION

1. Field of the Invention

The present invention relates to a vehicle ventilation duct for letting out air inside a vehicle passenger room to the outside of a vehicle or vice versa.

2. Description of the Related Art

Vehicles are equipped with a ventilation duct for letting out air inside the passenger room to the outside or vice versa, one of ventilating apparatuses. The ventilation duct comprises a ventilation opening which is opened to the outside of a vehicle passenger room and is covered with a valve element opening outward to the vehicle passenger room and closing inward thereto. The ventilation duct communicates the inside of the vehicle passenger room with the outside of the vehicle. When opening or closing a vehicle door, air flows into the vehicle passenger room, and air with the same volume as that of the flowing-in air pushes the valve element to open. The air having pushed the valve element to open is let out to the outside of the vehicle passenger room by way of the ventilation opening.

When the valve element is opened, noises such as road noises, pattern noises and brake noises have come into the vehicle passenger room from the outside of the vehicle by way of the ventilation opening. Japanese Unexamined Patent Publication (KOKAI) No. 15-182,344, Japanese Unexamined Patent Publication (KOKAI) No. 2001-130,447 and Japanese Unexamined Patent Publication (KOKAI) No. 2002-172,927 disclose inventions which were developed in order to reduce the noises.

Figure 11:
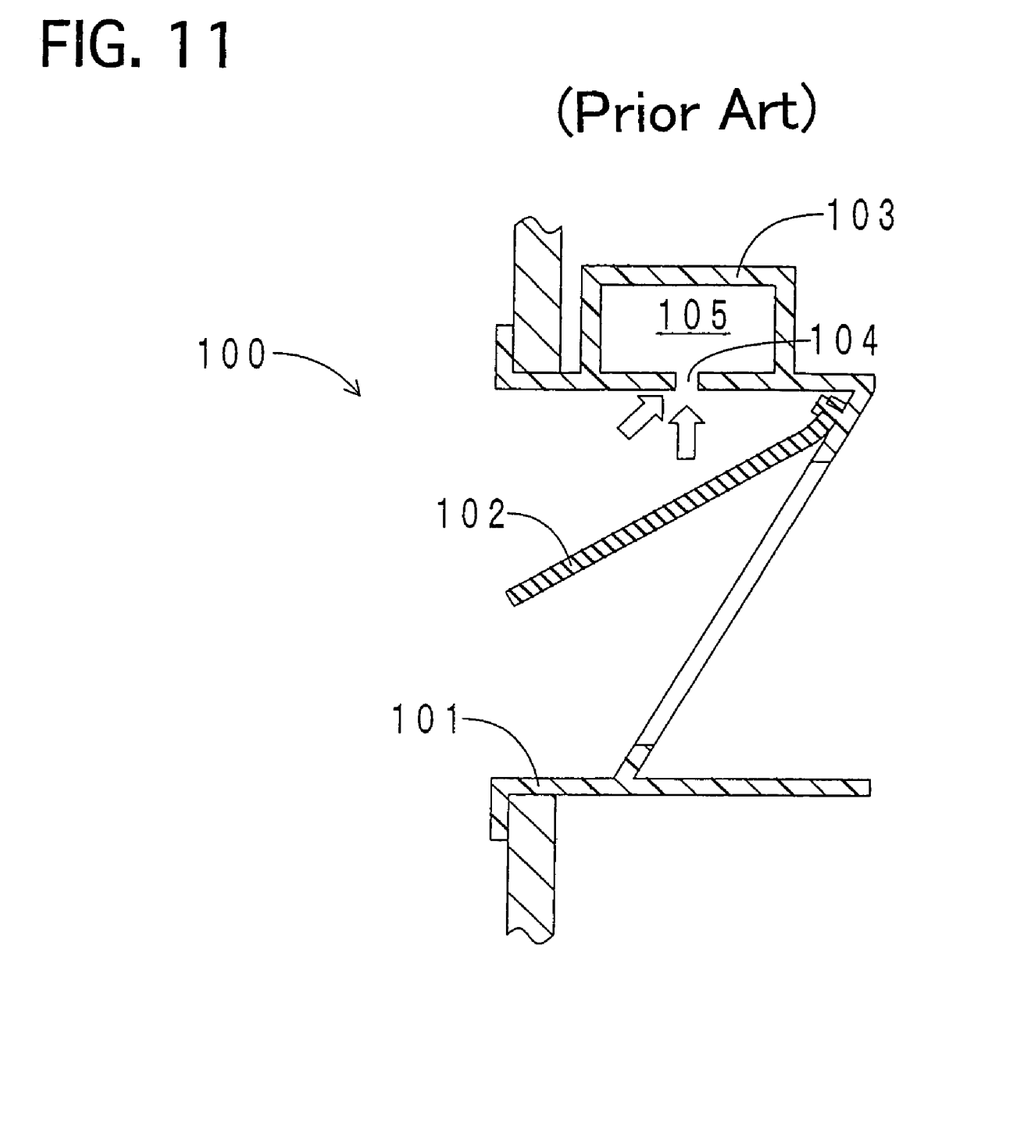
FIG. 11 a cross-sectional view of the conventional vehicle ventilation duct.

Japanese Unexamined Patent Publication (KOKAI) No. 15-182,344 discloses a ventilation duct equipped with a resonator. FIG. 11 illustrates a cross-sectional view of the ventilation duct set forth in the publication. As shown in FIG. 11, a ventilation duct 100 comprises a duct body 101, a sheet-shaped valve element 102, and a resonator 103. As depicted with the blank arrow of the drawing, noises come into a resonator chamber 105 of the resonator 103 by way of a minor hole 104. The resonator chamber 105 suppresses an acoustic pressure of around 63 Hz, some of the noises, by the Helmholtz's resonance theory.

The ventilation duct disclosed in Japanese Unexamined Patent Publication (KOKAI) No. 15-182,344, however, suppresses the acoustic pressure in the limited frequency band falling in a relatively narrow range only. Accordingly, in order to suppress acoustic pressures over a relatively wide range, it is required to independently dispose a plurality of resonators whose intended suppressing frequency band differs with each other. Consequently, the ventilation duct 100 has enlarged inevitably.

Japanese Unexamined Patent Publication (KOKAI) No. 2001-130,447 discloses an air vent structure with a shielding plate installed in the air outlet passage. The shielding plate has a slant surface for reducing air resistance. The shielding plate shields noises which pass through the air outlet passage so that the air vent structure reduces the noises.

In the air vent structure set forth in Japanese Unexamined Patent Publication (KOKAI) No. 2001-130,447, however, noises which have passed the shielding plate disposed in the air outlet passage are transmitted into a vehicle passenger room as they are. Accordingly, the noises have been transmitted to passengers as annoying noises. Moreover, the air outlet passage is communicated with a ventilation opening which is opened to a vehicle passenger room. Consequently, noises have reached passengers directly from the ventilation opening so that the passengers feel them as louder noises which have not been attenuated at all.

Japanese Unexamined Patent Publication (KOKAI) No. 2002-172,927 discloses a ventilation duct in which an air passage opening is formed in the side wall of the air passage and a sound absorption member is disposed on an inner peripheral surface of the air passage. The sound absorption member absorbs noises which transmit in the air passage so that the noises are reduced. Moreover, depending on the positions of the air passage opening formed in the side wall of the air passage, noises do not run into passengers who are sitting in a vehicle passenger room directly. As a result, the level of noises felt by the passengers annoying has fallen.

The ventilation duct set forth in Japanese Unexamined Patent Publication (KOKAI) No. 2002-172,927 suffers from a problem that no sufficient air outlet can be obtained because the size of the air passage opening is limited. That is, the opening magnitude of the air passage opening can be enlarged unless the protrusion of the sound absorbing chamber is expanded. In addition, the flow of air which has come into the sound absorbing chamber through the air passage opening is deflected in the sound absorbing chamber. Accordingly, there arises great air resistance when the air passes through the inside of the sound absorbing chamber. In order to reduce the air resistance, it is required to prolong the distance between the bottom surface of the sound absorbing chamber and the duct body (or to expand the protrusion of the sound absorbing chamber). Note that, however, ventilation ducts are disposed between the exterior of vehicles and the interior. Consequently, the space for disposing ventilation ducts is confined in limited areas. As a result, it is difficult to make the distance longer in certain vehicles.

Thus, it has been difficult for the conventional ventilation ducts to reduce the transmission noises which come into vehicle passenger rooms.

SUMMARY OF THE INVENTION

The present invention has been developed in view of the aforementioned circumstances. It is therefore an object of the present invention to provide a ventilation duct for vehicles, ventilation duct which can suppress acoustic sounds of frequency bands over a relatively wide range, which can let out air inside vehicle passenger rooms to the outside without disturbance, which hardly transmits noises into vehicle passenger rooms from the outside, and which can be downsized.

A ventilation duct for vehicles according to the present invention can solve the aforementioned problems, is for letting out air in a vehicle passenger room to the outside of a vehicle, and comprises:

a duct body disposed in a vehicle outer hull, and comprising a frame having a ventilation opening opened to the outside of a vehicle and a valve element covering the ventilation opening openably and closably;

a conduit formed integrally with or independently of the duct body, disposed on a vehicle-passenger-room side of the duct body, communicated with the ventilation opening of the duct body, and communicated with the inside of a vehicle passenger room, whereby enabling air inside and outside the vehicle to pass therethrough back and forth;

a sound absorption chamber;

a transmission opening communicating the conduit with the sound absorption chamber; and an air-permeable member closing the transmission opening permeably.

Specifically, the present ventilation duct comprises the air-permeable member and the sound absorption chamber. The air-permeable member divides between the conduit and the sound absorption chamber. The conduit communicates the inside of the vehicle passenger room with the outside of the vehicle. The noises coming from the outside of the vehicle enter the sound absorption chamber through the conduit by way of the air-permeable member. When the noises enter the air-permeable member, air present in the air-permeable member vibrates. Then, the viscosity of the air converts the energy of the noises into thermal energy. Accordingly, the energy of the noises reduces. The noises, which have passed through the air-permeable member, transmit through the air layer in the sound absorption chamber, collide with and reflect at the wall surfaces demarcating the sound absorption chamber. The transmission and reflection furthermore reduce the energy of the noises. Moreover, the reflected noises return back into the conduit from the sound absorption chamber by way of the air-permeable chamber. In this instance, the air-permeable member reabsorbs the energy of the reflected noises. In addition, the phase difference between the reflected noises and the incident noises moreover attenuates the energy of the noises. In particular, when the reflected noises and the incident noises are in opposite phase to each other, the energy attenuation enlarges. Thus, the present ventilation duct can suppress the acoustic pressure of the noises, because the noises pass through the air-permeable member back and forth, transmit in the sound absorption chamber, and reflect at the wall surfaces of the sound absorption chamber. Moreover, the neighboring air-permeable member and sound absorption member can suppress acoustic sounds of frequency bands over a wider range than the case where the air-permeable member is disposed independently or the case where the resonator 103 is disposed independently as in the conventional ventilation duct illustrated in FIG. 11.

In addition, it is unnecessary to dispose a plurality of sound absorption chambers, because the present ventilation duct can suppress noises of frequency bands over a relatively wide range with the individual sound absorption chamber. Accordingly, it is possible to downsize the present ventilation duct. Moreover, the sound absorption chamber is disposed more inside than the valve element is. In addition, the transmission opening is covered with the air-permeable member. Consequently, foreign materials such as raindrops, dust and dirt are less likely to come into the sound absorption chamber. Therefore, the present ventilation duct exhibits its high operation reliability.

It is preferable to arrange the present storage apparatus so that it can further comprise a housing disposed on a vehicle-passenger-room side of the duct body, formed independently of the duct body, and being provided with the conduit, the sound absorption chamber, and the transmission opening and the air-permeable member. With such an arrangement, it is easier to manufacture not only the conduit but also the entire present ventilation duct, compared with the case where the duct body is formed integrally with the conduit.

It is preferred that the housing can comprise an opposite wall facing the ventilation opening of the duct body and having a recess demarcating the sound absorption chamber; and the air-permeable member can be disposed so as to cover the recess of the housing. In the thus arranged present ventilation duct, the air-permeable member is disposed so as to face the ventilation opening through which noises pass. Accordingly, it is possible to introduce the most part of noises not into the vehicle passenger room, but into the sound absorption chamber. Consequently, the present ventilation duct can produce an enhanced noise-suppression effect.

It is preferred that the transmission opening can be opened in one of the walls of the housing, and can occupy 50% or more of the entire area of the wall with the transmission opening formed. The transmission-opening area can preferably occupy 50% or more of the entire area of the wall, because the transmission opening area of less than 50% is so narrow that noises might be less likely to be introduced into the sound absorption chamber. Note herein that the larger the transmission-opening area is the more noises are likely to be introduced into the sound absorption chamber.

It is preferred that the conduit can comprise a communication opening communicating the ventilation opening of the duct body with the inside of the vehicle passenger room, formed as a slit, having an opening periphery and a louver disposed in the opening periphery, the louver covering the communication opening permeably. With such an arrangement, noises which have passed through the communication opening and try to come into the vehicle passenger room collide with the louver. Accordingly, the energy of the noises is attenuated. Consequently, the present ventilation duct can produce a much more enhanced noise-suppression effect.

In accordance with another aspect of the present invention, the aforementioned problems can be solved as well. A ventilation duct according to another aspect of the present invention is for vehicles, is for letting out air in a vehicle passenger room to the outside of a vehicle, and comprises:

a duct body disposed in a vehicle outer hull, and comprising a frame having a ventilation opening opened to the outside of a vehicle and a valve element covering the ventilation opening openably and closably;

a housing formed integrally with or independently of the duct body, and comprising a conduit and an opposite wall, the conduit disposed on a vehicle-passenger-room side of the duct body, communicated with the ventilation opening of the duct body, and communicated with the inside of a vehicle passenger room, the opposite wall facing the ventilation opening of the duct body, and comprising a communication opening communicating the ventilation opening of the duct body with the inside of the vehicle passenger room, formed as a slit, having an opening periphery and a louver disposed in the opening periphery, the louver covering the communication opening permeably, whereby enabling air inside and outside the vehicle to pass therethrough back and forth.

Specifically, the present ventilation duct comprises the housing disposed in the duct body independently. The housing comprises the opposite wall, and the communication opening formed in the opposite wall and covered with the louver. Noises generated outside the vehicle, such as road noises and pattern noises, intrude into the present ventilation duct through the ventilation opening of the duct body. Noises which have passed thorough the ventilation opening collide directly with the opposite wall which is disposed so as to face the ventilation opening. Moreover, the noises also collide with the louver disposed in the communication opening of the opposite wall. In this instance, the collisions let the noises re-reflect back into the duct body from the conduit of the housing. Accordingly, the noises collide with the wall surfaces demarcating the conduit repeatedly. Consequently, the noises are attenuated.

Moreover, air inside the vehicle passenger room flows into the present ventilation duct through the communication opening, which is disposed in the opposite wall of the housing, by way of an air outlet passage of the vehicle. Specifically, air, which has passed through the communication opening facing the duct body and flows into the present ventilation duct, passes the duct body without exerting resistance to the duct body. Thus, the present ventilation duct ensures a satisfactory volume of air discharge to the outside of the vehicle.

The communication opening can be opened partially at least in the opposite wall which demarcates the conduit. Here, the communication opening can be opened to such an extent that it enables air to pass in a required volume. It is not excluded, however, to form the communication opening in the entire surface of the opposite wall simultaneously.

It is preferred that the communication opening of the opposite wall can be opened at a position away from a head of a passenger who is siting in the vehicle equipped with the present ventilation duct. When the communication opening is opened at such a position, it is possible to prolong the distance between the ventilation opening, which becomes the source of noises for a passenger siting in the vehicle equipped with the present ventilation duct, and the passenger' ears, which perceive the noises. That is, the noises emitted from the ventilation opening attenuate until they reach the passenger's ears. Thus, it is possible to reduce the magnitude of the noises perceived by the passenger. The distance between the communication opening and a passenger cannot be determined explicitly because it depends on vehicles to which the present ventilation duct is installed. Note however that the greater the distance between the communication opening and a passenger is the less noises are likely to be perceived by the passenger.

Note that noises, which have passed through the duct body, collide with the surface of the louver which faces the duct body. Accordingly, it is preferable to form the surface of the louver facing the duct body in a curved manner so that the noises, which have passed through the duct body to collide with the surface of the louver, reflect back into the duct body.

It is therefore preferred that the louver of the communication opening can be curved as a convexed shape at middle in a cross section taken vertically with respect to the length direction.

Moreover, it is preferred that the housing can further comprise a side wall with an air passage opening formed. When the housing further has a side wall provided with an air passage opening, it is possible to reduce the opening magnitude of the communication opening because extra air can be fed into the present ventilation duct through the air passage opening.

In addition, the present ventilation duct can preferably further comprise a sound absorption member disposed on an inner peripheral surface of the conduit. An inner peripheral surface of the conduit with a sound absorption member absorbs sounds transmitting in the conduit, thereby making it possible to reduce noises transmitting into the vehicle passenger room. Moreover, it is possible to inhibit the conduit per se from resonating with the transmitting sounds to generate extra noises.

The materials making the present ventilation duct are not limited at all as far as they can make the above-described arrangements. That is, the present ventilation duct can be made of materials which have been used in the manufacture of conventional vehicle ventilation ducts. For example, the present ventilation duct can be manufactured using resins and metals.

In accordance with the present invention, it is possible to provide a vehicle ventilation duct which can suppress acoustic sounds of frequency bands over a relatively wide range, which can be downsized, and whose operation reliability is high. Moreover, in accordance with another aspect of the present invention, it is possible to provide a vehicle ventilation duct which can let out air coming from the inside of vehicle passenger rooms without restraint, and which hardly transmits noises coming from the outside of vehicles into vehicle passenger rooms by reflecting the noises at the louver disposed in the communication opening.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims. Hereinafter, the present invention will be described with reference to forms of embodying the present vehicle ventilation duct.

EXAMPLES

Example No. 1

Figure 1:
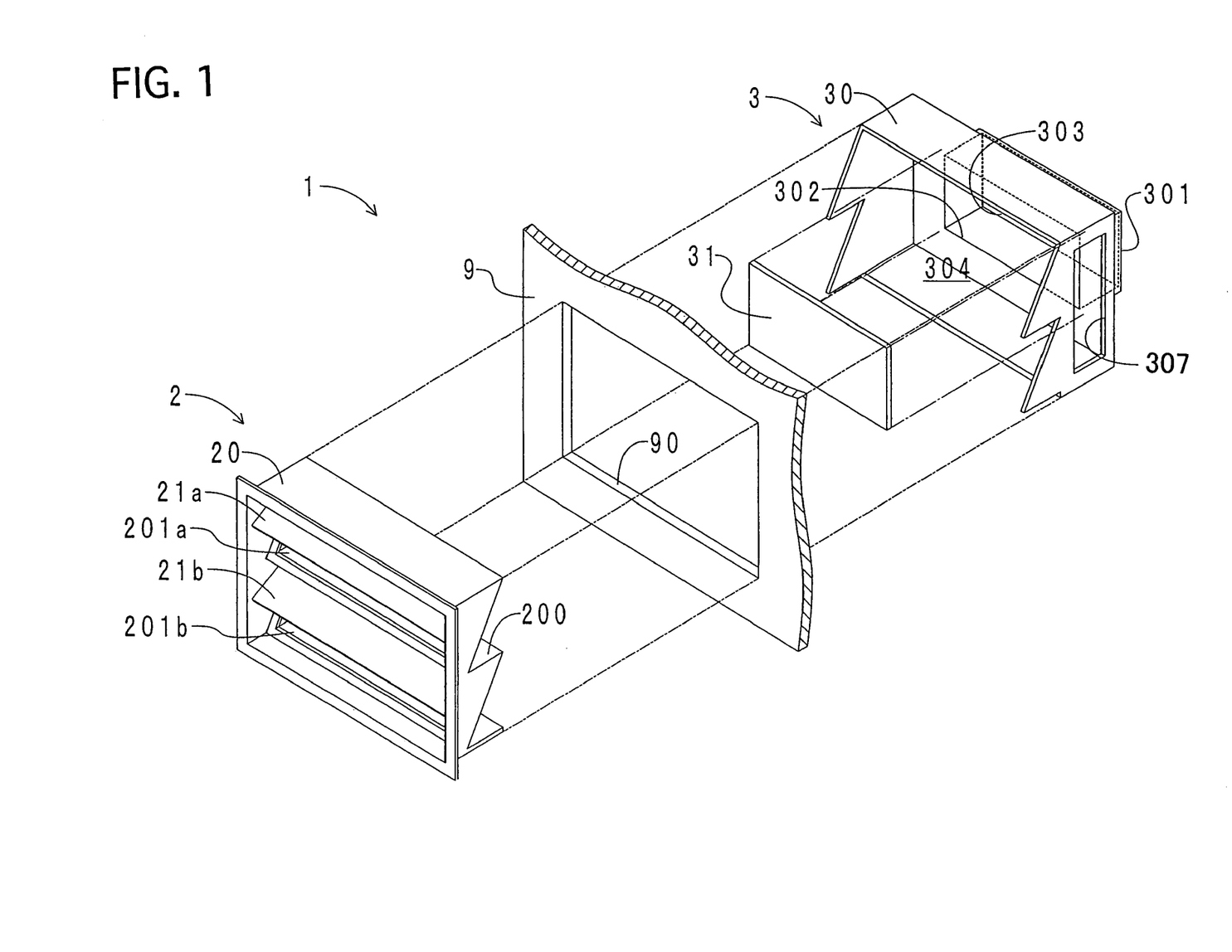
FIG. 1 is an exploded perspective view of a vehicle ventilation duct according to Example No. 1 of the present invention.
Figure 2:
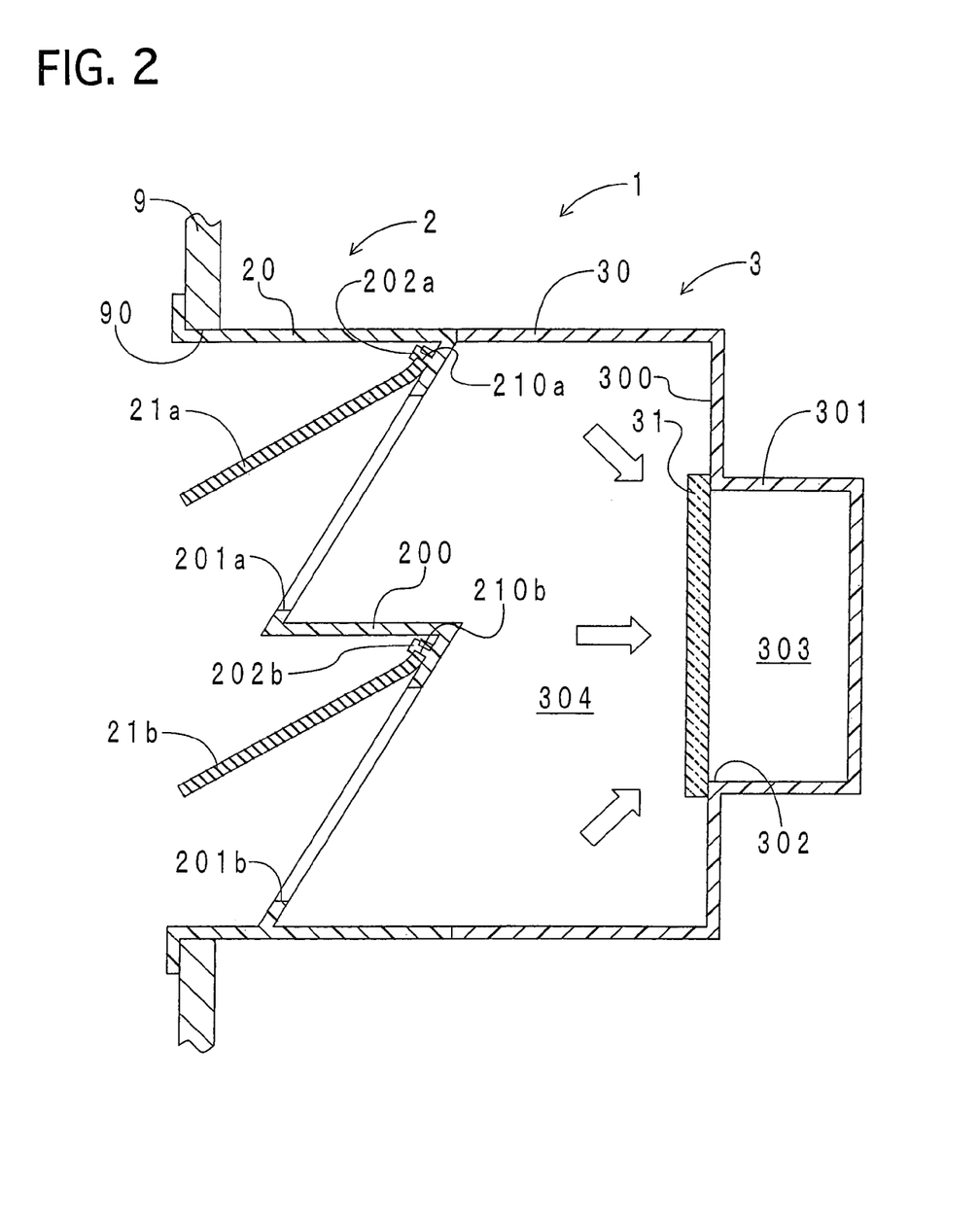
FIG. 2 is a cross-sectional view of the vehicle ventilation duct according to Example No. 1.

First, the arrangement of a ventilation duct for vehicles according to Example No. 1 of the present invention will be hereinafter described in detail. FIG. 1 illustrates an exploded perspective view of the ventilation duct. FIG. 2 illustrates a cross-sectional view of the ventilation duct. As shown in the drawings, a ventilation duct 1 comprises a duct body 2, and a housing 3.

The duct body 2 is buried in a rectangle-shaped duct installation opening 90 which is opened in a quarter panel 9. Note that the present vehicle outer hull includes the quarter panel 9. The duct body 2 comprises a frame 20, and sheet-shaped valve elements 21a, 21b. Note that the present valve element includes both sheet-shaped valve elements 21a, 21b. The frame 20 is made of resin, and is formed as a squared cylinder shape. A partition wall 200 extending in the horizontal direction is disposed at the middle in the up/down direction of the frame 20. As illustrated in FIG. 2, a rectangle-shaped ventilation opening 201a is formed in the upper half of the partition wall 200. Moreover, a ventilation opening 201b of the same rectangle shape is formed in the lower half of the partition wall 200. A valve-element-engagement projection 202a protrudes from the upper rim of the ventilation opening 201a outward with respect to a vehicle passenger room (not shown). Likewise, a valve-element-engagement projection 202b protrudes from the upper rim of the ventilation opening 202b outward with respect to the vehicle passenger room.

The sheet-shaped valve element 21a is made of rubber, and is formed as a rectangular plate shape. An engagement hole 210a is bored through in the upper rim of the sheet-shaped valve element 21a. The valve-element-engagement projection 202a is fitted into and engaged with the engagement hole 210a, and thereby the sheet-shaped valve element 21a covers the ventilation opening 201a openably and closably. Similarly, the sheet-shaped valve element 21b is made of rubber, and is formed as a rectangular plate shape. An engagement hole 210b is bored through in the upper rim of the sheet-shaped valve element 21b. The valve-element-engagement projection 202b is fitted into and engaged with the engagement hole 210b, and thereby the sheet-shaped valve element 21b covers the ventilation opening 201b openably and closably.

The housing 3 comprises a housing body 30, and an air-permeable member 31. The housing body 30 is made of resin, and is formed as a box shape which opens to the duct body 2. The housing 30 is welded to the duct body 20 at the opening rim, and is thereby fastened to a vehicle-passenger-room side of the duct body 2. The housing body 30 comprises an opposite wall 300 facing the ventilation openings 201a, 201b. A rectangular cup-shaped recess 301 is made in the opposite wall 300. The inner rim of the recess 301 demarcates a transmission opening 302.

The air-permeable member 31 is made of continuously-foamed sponge, and is formed as a rectangular plate shape. The air-permeable member 31 covers the transmission opening 302 inward with respect to the outside of a vehicle (not shown). The air-permeable member 31 and the recess 301 surround and demarcate a sound absorption chamber 303. Moreover, the outer side of the air-permeable member 31 with respect to the vehicle passenger room demarcates a communication chamber 304. That is, the air-permeable member 31 divides between the communication chamber 304 and the sound absorption chamber 303. As shown in FIG. 1, a rectangle-shaped air passage opening 307 is opened in a side wall of the housing body 30 which demarcates the communication chamber 304. The communication chamber 304 is communicated with the inside of the vehicle passenger room by way of the air passage opening 307. Note that the communication chamber 304, the air passage opening 307 and the walls of the housing body 30 demarcating them make the present conduit.

The operations of the ventilation duct 1 according to Example No. 1 will be hereinafter described. For example, when opening or closing a vehicle door, air flows into the vehicle passenger room, and air with the same volume as that of the flowing-in air flows into the communication chamber 304 through the air passage opening 307. The flowing-in air pushes the sheet-shaped valve elements 21a, 21b to open. The air having pushed the sheet-shaped valve elements 21a, 21b to open is let out to the outside of the vehicle by way of the ventilation openings 201a, 201b.

When the sheet-shaped valve elements 201a, 201b open, noises such as road noises, pattern noises and brake noises transmit into the communication chamber 304 from the outside of the vehicle by way of the ventilation openings 201a, 201b. The noises enter the sound absorption chamber 303 by way of the air-permeable member 31 directly or indirectly after being reflected at the walls of the housing body 3 demarcating the communication chamber 304 as illustrated with the blank arrows of FIG. 2. The incident noises transmit through the air layer in the sound absorption chamber 303, reflect at the walls demarcating the sound absorption chamber 303, and reenter the communication chamber 304 by way of the air-permeable chamber 31. The noises, which have reentered the communication chamber 304, are introduced into the vehicle passenger room by way of the air passage opening 307. Additionally, the noises are emitted to the outside of the vehicle by way of the ventilation openings 201a, 201b.

Next, the advantages effected by the ventilation duct 1 according to Example No. 1 will be hereinafter described. In the ventilation duct 1, the noises coming from the outside of the vehicle enter the sound absorption chamber 303 through the communication chamber 304 by way of the air-permeable member 31. The air-permeable member 31 absorbs the energy of the incident noises. The noises, which have passed the air-permeable member 31, transmit in the air layer of the sound absorption chamber 303, and collide with and reflect at the wall demarcating the sound absorption chamber 303. The transmission and reflection occur repeatedly, and thereby the energy of the noises is attenuated. Moreover, the reflected noises return back into the communication chamber 304 from the sound absorption chamber 303 by way of the air-permeable chamber 31. In this instance, the air-permeable member 31 reabsorbs the energy of the reflected noises. In addition, the phase difference between the reflected noises and the incident noises attenuates the energy of the noises. Thus, the ventilation duct 1 can suppress noises of frequency bands over a relatively wide range, because noises pass through the air-permeable member 31, transmit in the sound absorption chamber 303 and reflect at the walls of the sound absorption chamber 303.

Further, in the ventilation duct 1 according to Example No. 1, the transmission opening 302 is disposed in the relatively wide opposite wall 300. Accordingly, it is possible to provide the transmission opening 302 with a wide area. Furthermore, the opening area of the transmission opening 302 occupies from 50 to 60% of the opposite wall 300. Consequently, it is possible to introduce most of the noises entering the communication chamber 304, not into the vehicle passenger room, but into the sound absorption chamber 303.

Moreover, the ventilation duct 1 according to Example No. 1 can suppress noises of frequency bands over a relatively wide range with the single sound absorption chamber 303. Accordingly, it is not necessary to dispose a plurality of the sound absorption chambers 303. Consequently, it is possible to further downsize the ventilation duct 1. Note that the sound absorption chamber 303 is disposed on a more inner side of the vehicle than the sheet-shaped valve elements 21a, 21b are. Besides, the air-permeable member 31 covers the transmission opening 302. As a result, foreign materials such as raindrops, dust and dirt are less likely to come into the sound absorption chamber 303. Therefore, the ventilation duct 1 exhibits high operation reliability.

In addition, in the ventilation duct 1 according to Example No. 1, the air-permeable member 31 is disposed so as to face the ventilation openings 201a, 201b through which noises pass. In view of the arrangement, it is possible to introduce most of the noises entering the communication chamber 304, not into the vehicle passenger room, but into the sound absorption chamber 303. Thus, the ventilation duct 1 produces an enhanced noise-suppression effect.

Example No. 2

A ventilation duct according to Example No. 2 of the present invention differs from the ventilation duct 1 according to Example No. 1 in that it comprises a communication opening which is formed as a slit; and a louver is disposed in the communication opening. Therefore, only the differences will be hereinafter described.

Figure 3:
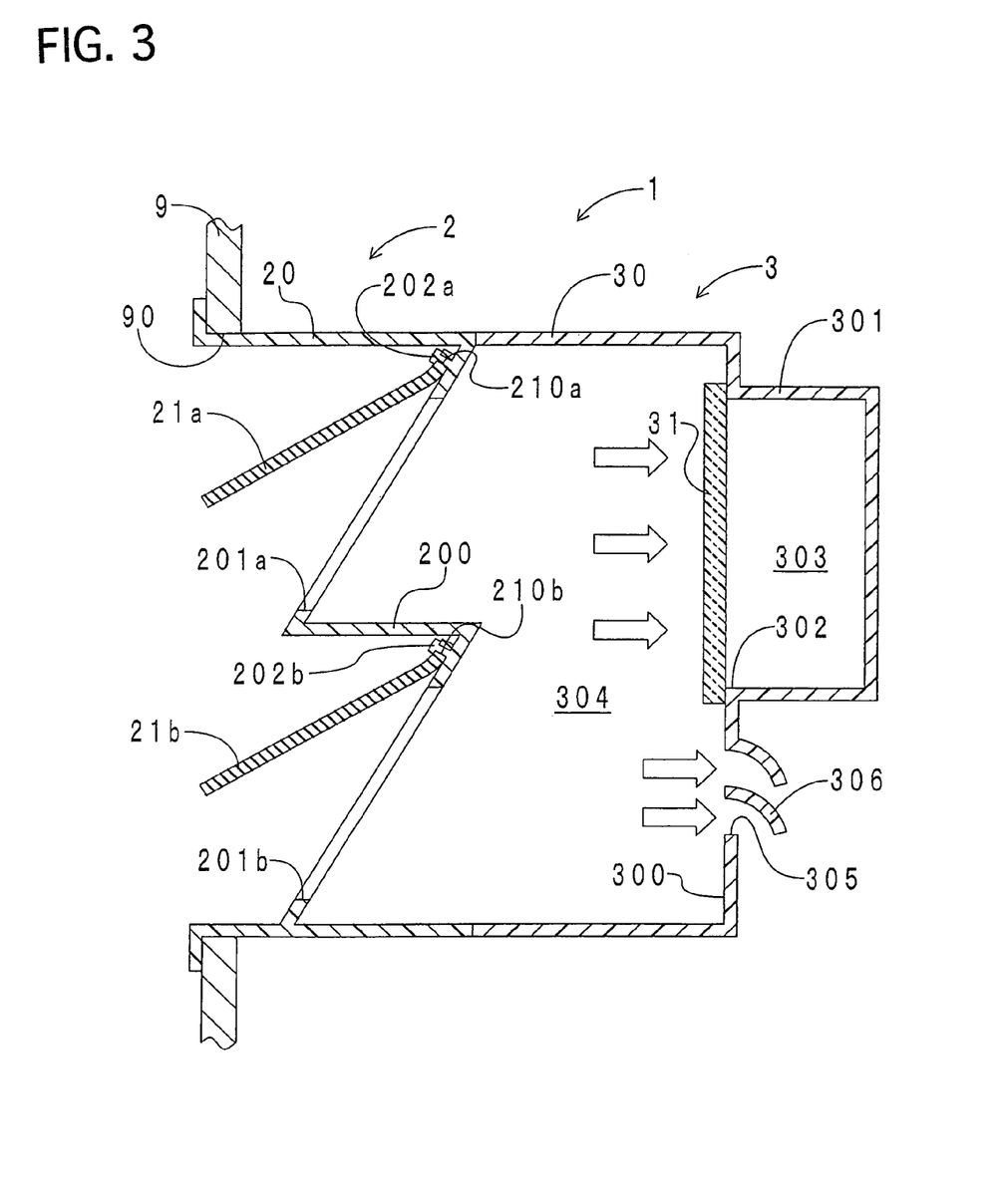
FIG. 3 is a cross-sectional view of a vehicle ventilation duct according to Example No. 2 of the present invention.

FIG. 3 illustrates a cross-sectional view of a vehicle ventilation duct 1 according to Example No. 2 of the present invention. In FIG. 3, note that parts like those of FIGS. 1 and 2 are designated at the same reference numerals. As shown in the drawing, a communication opening 305 is opened in the lower part of the opposite wall 300. The communication opening 305 is formed as a slit extending in the horizontal direction of the opposite wall 300 (or in the direction perpendicular to the sheet). That is, the communication opening 305 is slit as two opening strips neighboring in the up/down direction of the opposite wall 300. Moreover, a downwardly-curving louver 306 is formed integrally with the upper rim of the respective opening strips of the communication opening 305 on the vehicle-passenger-room side.

The ventilation duct 1 according to Example No. 2 effects advantages in the same manner as the ventilation duct 1 according to Example No. 1. Moreover, in the ventilation duct 1 according to Example No. 2, the noises, which pass through the communication opening 305 to enter the vehicle passenger room, collide with the louvers 306. The collision furthermore attenuates the energy of the noises. Therefore, the ventilation duct 1 according to Example No. 2 produces a more enhanced noise-suppression effect.

Modified Versions

Heretofore, a few of the embodiment modes of the present ventilation duct are described. However, the embodiment modes are not limited to Example Nos. 1 and 2 particularly. It is possible to perform the present ventilation duct in various modified embodiment modes or improved embodiment modes which one of ordinary skill in the art can carry out.

For example, in the above-described examples, the recess 301 is disposed in the opposite wall 301. However, the recess 301 can be disposed in the top wall, bottom wall or side walls of the housing body 30. Moreover, in the examples, the recess 301 is disposed to demarcate the sound absorption chamber 303. However, it is possible to demarcate the sound absorption chamber 303 by simply dividing the inside of the identical cup-shaped housing body 30 with the air-permeable member 31 as a double bottom construction, without disposing the recess 301. With such an arrangement, it is possible to absorb the energy of noises by the membrane vibration effect resulting from the air-permeable member 31's own vibration.

In addition, in the above-described examples, the air-permeable member 31 made of continuously-foamed sponge is disposed to cover the transmission opening 302. However, the type of materials making the air-permeable member 31 is not limited in particular. For example, it is possible to use various nonwoven cloths, woven cloths and perforated plates to make the air-permeable member 31.

Example No. 3

Figure 4:
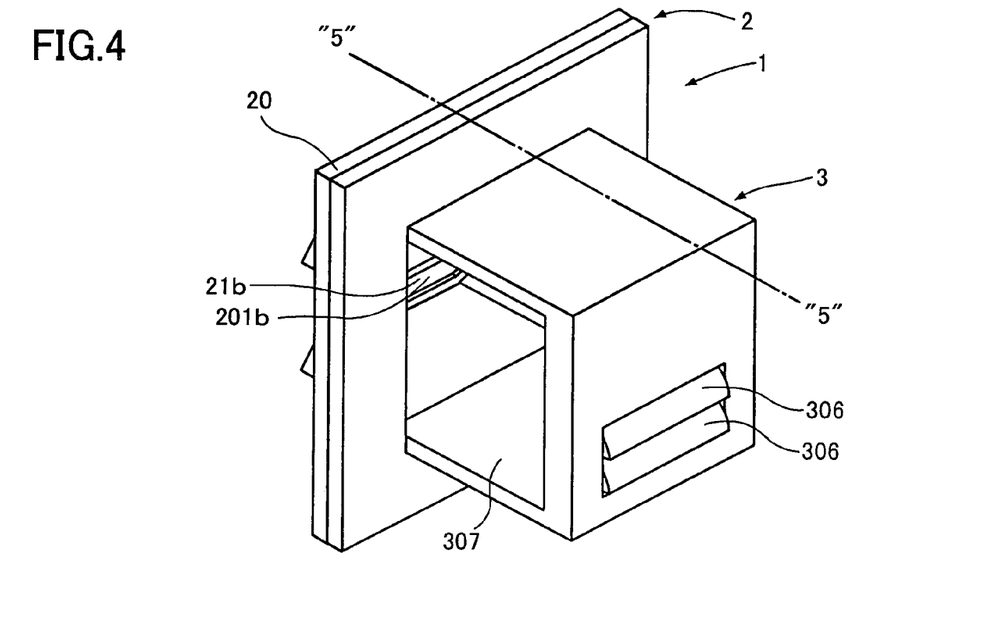
FIG. 4 is a perspective view of a vehicle ventilation duct according to Example No. 3 of the present invention.
Figure 5:
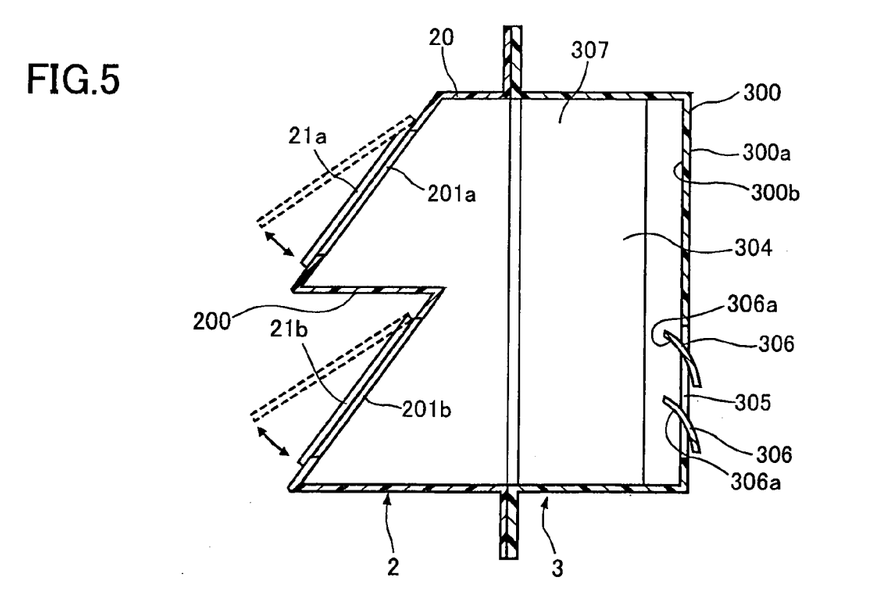
FIG. 5 is a cross-sectional view of the vehicle ventilation duct according to Example No. 3 taken along the chain line "5"—"5" of FIG. 4.
Figure 6:
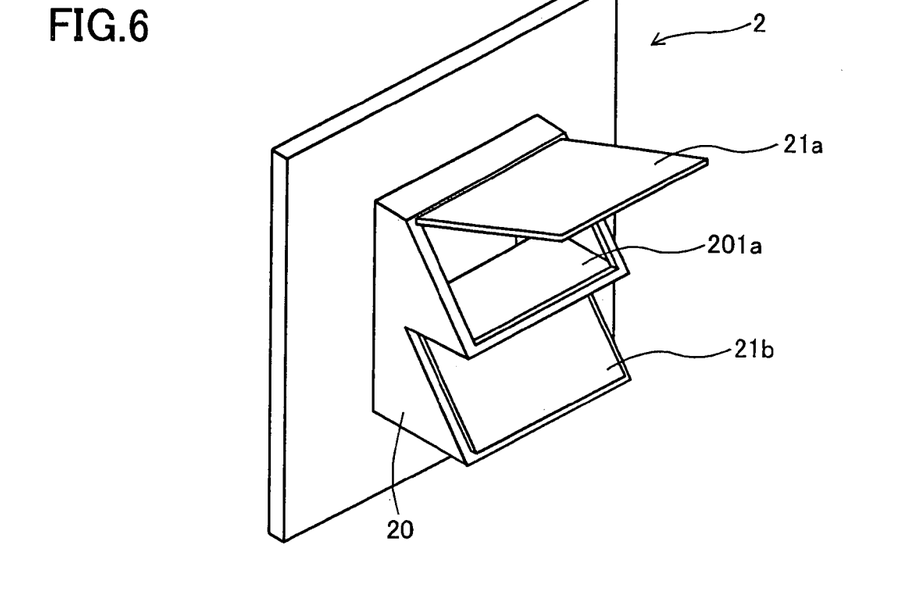
FIG. 6 is a perspective view of a duct body of the vehicle ventilation duct according to Example No. 3.
Figure 7:
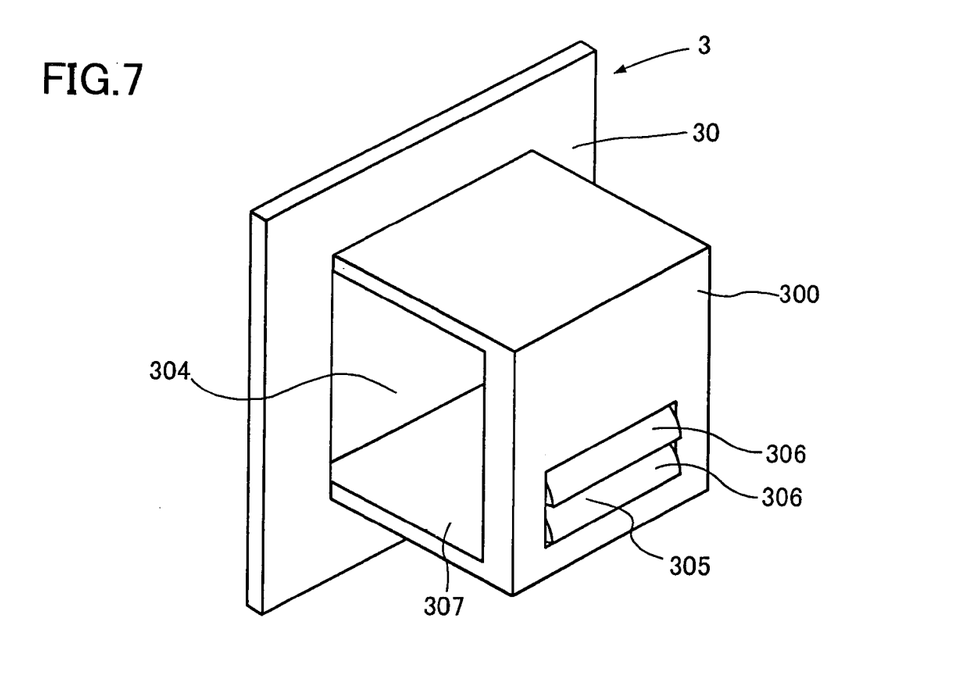
FIG. 7 is a perspective view of a housing of the vehicle ventilation duct according to Example No. 3.

First, the arrangement of a ventilation duct for vehicles according to Example No. 3 of the present invention will be hereinafter described in detail. FIG. 4 illustrates a perspective view of the ventilation duct. FIG. 5 illustrates a cross-sectional view of the ventilation duct taken along the chain line "5"—"5" of FIG. 4. FIG. 6 illustrates a perspective view of a duct body of the ventilation duct viewed on the rear side (or on the outside of a vehicle). FIG. 7 illustrates a perspective view of a housing of the ventilation duct. As shown in the drawings, a ventilation duct 1 comprises a duct body 2, and a housing 3. Moreover, the duct body 2 and housing 3 making the ventilation duct 1 are formed of polypropylene.

The duct body 2 is buried in a rectangle-shaped duct installation opening which is opened in a quarter panel. Note that the present vehicle outer hull includes the quarter panel. The duct body 2 comprises a frame 20, and sheet-shaped valve elements 21a, 21b. Note that the present valve element includes both sheet-shaped valve elements 21a, 21b. The frame 20 is formed as a squared cylinder shape which protrudes toward the outside of a vehicle. A partition wall 200 extending in the horizontal direction is disposed at the middle in the up/down direction of the frame 20. As illustrated in FIG. 5, a rectangle-shaped ventilation opening 201a is formed above the partition wall 200. Moreover, a ventilation opening 201b of the same rectangle shape is formed below the partition wall 200.

The sheet-shaped valve elements 21a, 21b are made of rubber, and are formed as a rectangular shape. The sheet-shaped valve elements 21a, 21b are installed to the ventilation opening 201a, 201b in the same manner as Example No. 1. Specifically, valve-element-engagement projections (not shown) protrude from the upper rim of the ventilation openings 201a, 201b outward with respect to a vehicle passenger room (not shown), respectively. Engagement holes (not shown) are bored through in the upper rim of the sheet-shaped valve elements 21a, 21b, respectively. The valve-element-engagement projections are fitted into and engaged with the engagement holes, and thereby the sheet-shaped valve elements 21a, 21b cover the ventilation openings 201a, 201b openably and closably, respectively.

The housing 3 is formed as a box shape which opens to the duct body 2. The housing 3 is welded to the duct body 20 at the opening rim, and is thereby fastened to a vehicle-passenger-room side of the duct body 2. In the housing 3, a communication opening 305 is opened in the lower part of an opposite wall 30, which faces the lower ventilation opening 201b, as shown in FIG. 5. The communication opening 305 is formed as a slit extending in the horizontal direction of the opposite wall 300 (or in the direction perpendicular to the sheet on which FIG. 5, the cross-sectional view, is illustrated). Louvers 306, 306, which are disposed as two neighboring strips in the up/down direction of the opposite wall 30, are formed integrally with the opposite wall 300. Moreover, as illustrated in FIG. 4, a rectangle-shaped air passage opening 307 is opened in a side wall of the housing 3 which demarcates a communication chamber 304. The communication chamber 304 is communicated with the inside of the vehicle passenger room by way of the communication opening 305 and air passage opening 307. Note that the communication chamber 304, the communication opening 305, the air passage opening 307 and the walls of the housing 3 demarcating them make the present conduit.

The louvers 306, 306 are formed as a strip shape which extends in the direction perpendicular to the direction in which the sheet-shaped valve elements 21a, 21b neighbor (or in the direction perpendicular to the sheet on which FIG. 5, the cross-sectional view, is illustrated). The louvers 306, 306 have a bow shape, which is curved as a convex at the middle in the width direction of the strip shape, in a cross section taken perpendicular to the direction extending like a strip. Moreover, the louvers 306, 306 are disposed in an inclined manner with respect to the opposite wall 300. Specifically, the louvers 306, 306 have opposite ends in the width direction of the strip shape. One of the opposite ends is positioned on a lower side to protrude outwardly from an outer surface 300a of the opposite wall 300, and the other one of the opposite ends is positioned on an upper side to protrude inwardly from an inner surface 300b of the opposite wall 300 into the communication chamber 304.

A space is formed between a wall surface demarcating the communication opening 305 and one of the opposite ends of the louvers 306, 306 in the width direction of the strip shape, one of the opposite ends which faces the wall surface demarcating the communication opening 305. The opposite end of the louvers 306, 306 in the width direction of the strip shape, opposite end which faces the wall surface demarcating the communication opening 305, can be positioned above, flush with or below the wall surface demarcating the communication opening 305. Note that the opposite end can preferably be positioned below the wall surface. Moreover, the louvers 306, 306 are disposed so as not to position the opposite ends in the width direction of the strip shape flush with each other in the neighboring direction of the louvers 306, 306, but to position the opposite ends in a zigzag manner in the neighboring direction of the louvers 306, 306. In addition, the louvers 306, 306 are disposed so as to protrude the lower-side opposite end in the width direction of the strip shape from the outer surface 300a of the opposite wall 300.

The operations of the ventilation duct 1 according to Example No. 3 will be hereinafter described.

When air inside the vehicle passenger room flows out, the air flows into the communication chamber 304 by way of the air passage opening 307 and communication opening 305. The air, which has flown into the communication chamber 304 through the air passage opening 307, flows in the direction parallel to the opposite wall 300. Then, the flow of the air is deflected in the communication chamber 304, and thereby the air is flowed toward the duct body 2.

Moreover, the air inside the vehicle passenger room flows into the communication chamber 304 through the communication opening 305 as well. Note that the communication opening 305 is opened to face the duct body 2. As a result, the air, which has flown into the communication chamber 304 through the communication opening 305, flows toward the duct body 2 without being disturbed in the communication chamber 304.

The ventilation duct 1 according to Example No. 3 can ensure a sufficient volume of ventilation, because the air is introduced into the ventilation duct 1 not only through the air passage opening 307 opened in the side wall of the housing 3 but also through the communication opening 305 opened in the opposite wall 300. Specifically, the ventilation duct 1 can ensure a sufficient volume of ventilation, because the air flows into the ventilation duct 1 through the communication opening 305 even when the flow of the air flowing into the ventilation duct 1 through the air passage opening 307 is deflected toward the ventilation openings 201a, 201b to exert air resistance and thereby the flow volume of the air flowing into the ventilation duct 1 through the air passage opening 307 is reduced. Moreover, no large air resistance is applied to the air flowing into the ventilation duct 1 through the communication opening 305, because the communication opening 305 is opened at a position facing the ventilation openings 201a, 201b.

The air, which have flown into the communication chamber 304, flows toward the duct body 2, and pushes the sheet-shaped valve elements 21a, 21b to open toward the outside of the vehicle. Eventually, the air is let out to the outside of the vehicle through the ventilation openings 201a, 201b.

When the sheet-shaped elements 21a, 21b are pushed to open toward the outside of the vehicle as shown with the dashed line of FIG. 5, or when the sheet-shaped element 21a is put into a state as illustrated in FIG. 6, noises come into the vehicle passenger room through the ventilation openings 201a, 201b. The noises pass the duct body 2, and collide directly with the inner surface 300b of the opposite wall 300 in the communication chamber 304 as well as with the inner surface 306a of the louvers 306, 306. The thus colliding noises diffuse inside the communication chamber 304. Thus, the noises are attenuated to diminish. In particular, the ventilation duct 1 according to Example No. 3 comprises the louvers 306, 306 whose cross section is curved. Accordingly, the noises colliding with the louvers 306, 306 are reflected to the inside of the communication chamber 304. Moreover, the noises coming into the ventilation duct 1 through the ventilation openings 201a, 201b are reflected at the louvers 306, 306 which face the ventilation openings 201a, 201b. Consequently, the noises are less likely to come into the vehicle passenger room. As a result, the noises hardly contact with passengers in the vehicle passenger room directly.

Moreover, in the ventilation duct 1 according to Example No. 3, the opening area of the communication opening 305 is reduced because the communication opening 305 is formed in a lower part of the opposite wall 305 partially.

Example No. 4

Figure 8:
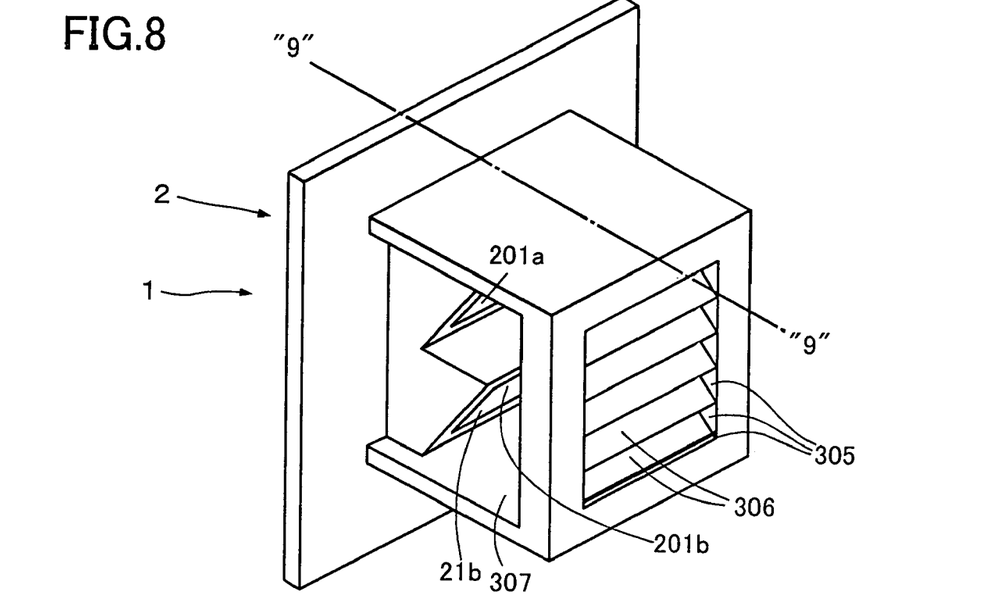
FIG. 8 is a perspective view of a vehicle ventilation duct according to Example No. 4 of the present invention.
Figure 9:
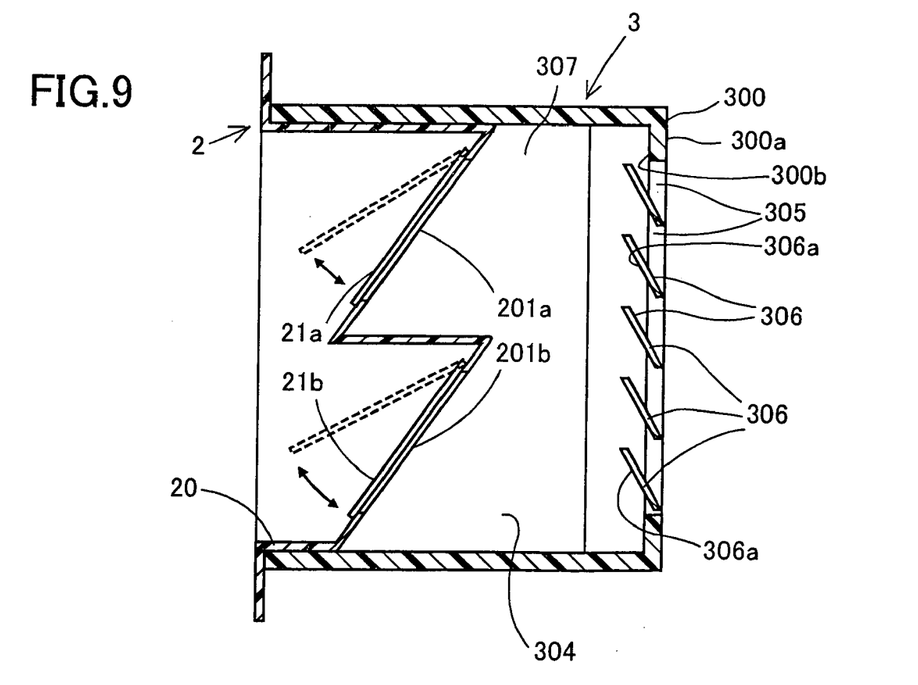
FIG. 9 is a cross-sectional view of the vehicle ventilation duct according to Example No. 4 taken along the chain line "9"—"9" of FIG. 8.

FIGS. 8 and 9 illustrate the arrangement of a ventilation duct 1 for vehicles according to Example No. 4 of the present invention. FIG. 8 shows a perspective view of the ventilation duct 1. FIG. 9 shows a cross-sectional view of the ventilation duct 1 taken along the chain line "9"—"9" of FIG. 8. Note that the component parts of the ventilation duct 1, which are not described specifically hereinafter, operate and effect advantages in the same manner as those of the ventilation duct 1 according to Example No. 3.

A duct body 2 comprises a frame 20 which is formed as a squared cylinder shape protruding to the inside of a vehicle passenger room as shown in FIG. 9. A plurality of louvers 306 are disposed over the entire surface of an opposite wall 300 substantially. Further, the louvers 306 are formed as a strip shape free of curvature. Furthermore, the neighboring louvers 306 are disposed so as not to position the inner opposite ends in the width direction of the strip shape flush with each other, but to position the inner opposite ends in a zigzag manner. Moreover, the louvers 306 are disposed so as not to position the inner and outer opposite ends in the width direction of the strip shape flush with the inner and outer surfaces 300b, 300a of the opposite wall 300 demarcating a communication opening 305, but to protrude the inner opposite end from the inner surface 300b and retract the outer opposite end from the outer surface 300a.

The ventilation duct 1 according to Example No. 3 can let the air coming from the inside of the vehicle passenger room flow to the outside of the vehicle without disturbance in the same manner as the ventilation duct 1 according to Example No. 3. Moreover, the ventilation duct 1 can reflect the noises coming from the outside of the vehicle at the louvers 306 disposed in the communication opening 305. Thus, the ventilation duct 1 can inhibit the noises from coming into the vehicle passenger room.

Modified Versions

Heretofore, another few of the embodiment modes of the present ventilation duct are described. However, the embodiment modes are not limited to Example Nos. 3 and 4 particularly. It is possible to perform the present ventilation duct in various modified embodiment modes or improved embodiment modes which one of ordinary skill in the art can carry out.

Figure 10:
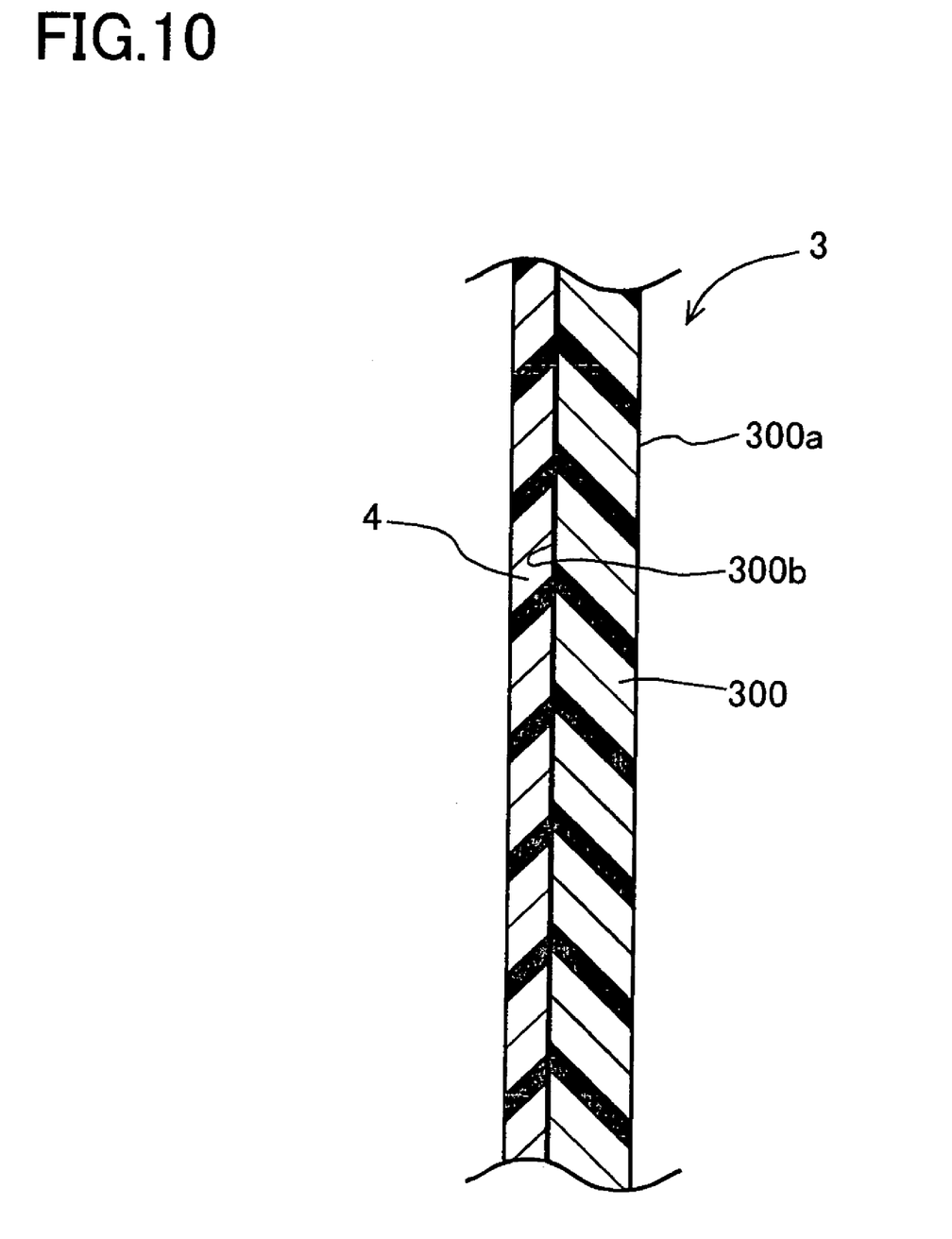
FIG. 10 is an enlarged cross-sectional view of a part of a ventilation duct according to a modified version of the present invention.

The ventilation duct 1 according to Example Nos. 3 and 4 can preferably further comprise a sound absorption member which is disposed on one of the inner surfaces demarcating the communication chamber 304. For example, as illustrated in FIG. 10, a sound absorption member 4 can be disposed on the inner surface 300b of the opposite wall 300 of the housing 3 facing the duct body 2. The type of materials making the sound absorption member is not limited in particular. For example, it is possible to use non-woven cloths such as felt, polyvinylchloride (PVC) foam and polyurethane (PUR) foam to make the sound absorption member. Note that felt and PVC foam exhibit a high sound absorption effect to noises of high-frequency ranges and PUR foam exhibits a high sound absorption effect to noises of low-frequency ranges. Accordingly, it is possible to carry out the present ventilation duct in such a mode that felt and/or PVC foam are combined with PUR foam. Note that felt comprises a structure in which fine fibers are entangled complicatedly and provides a wider contact area between the fibers and air. Consequently, felt can readily convert acoustic energy into thermal energy. That is, felt is good in terms of the sound absorption performance. In addition, felt is less expensive comparatively.

In the ventilation duct 1 according to Example Nos. 3 and 4, the air passage opening 307 is formed in two of the side walls of the four walls of the housing 3. However, it is possible to form the air passage opening 307 in all of the four walls of the housing 3, i.e., the two side walls, the top wall and the bottom wall.

In the ventilation duct 1 according to Example Nos. 3 and 4, the means for fastening the duct body 2 to the housing 3 is not limited in particular. For example, it is possible to name the following fastening methods, which have been used conventionally, as the fastening means: claw fitting by providing the duct body 2 and the housing 3 with a claw and a fitting into which the claw is fitted, respectively; clips; pins; and welding.

Moreover, it is possible to make a ventilation duct provided with the features of the ventilation duct 1 according to Example No. 2 and the features of the ventilation duct 1 according to Example Nos. 3 and 4. Specifically, the ventilation duct 1 according to Example No. 2 can further comprise an air passage opening which is opened in one of the side walls of the housing body 30. A ventilation duct with such a construction produces the advantage effected by the ventilation duct 1 according to Example No. 2, the effect of suppressing noises of frequency bands over a relatively wide range, and the advantage effected by the ventilation duct 1 according to Example Nos. 3 and 4, the effect of reducing noises while ensuring a sufficient volume of ventilation, at the same time.

Having now fully described the present invention, it will be apparent to one of ordinary skill in the art that many changes and modifications can be made thereto without departing from the spirit or scope of the present invention as set forth herein including the appended claims.

What is claimed is:

1. A ventilation duct for vehicles, the ventilation duct being for letting out air in a vehicle passenger room to the outside of a vehicle, and comprising:

a duct body disposed in a vehicle outer hull and comprising a frame having a ventilation opening opened to the outside of a vehicle and a valve element covering the ventilation opening openably and closably;

a conduit formed integrally with or independently of the duct body, wherein the conduit is disposed on a vehicle-passenger-room side of the duct body, communicated with the ventilation opening of the duct body and communicated with the inside of a vehicle passenger room, enabling air inside and outside the vehicle to pass therethrough back and forth;

a sound absorption chamber;

a transmission opening communicating the conduit with the sound absorption chamber;

an air-permeable member closing the transmission opening permeably; and a housing disposed on a vehicle-passenger-room side of the duct body, wherein the housing is formed independently of the duct body and is provided with the conduit, the sound absorption chamber, and the transmission opening and the air-permeable member, wherein:

the housing comprises an opposite wall facing the ventilation opening of the duct body and having a recess demarcating the sound absorption chamber; and the air-permeable member is disposed so as to cover the recess of the housing.

2. The ventilation duct set forth in claim 1, wherein the transmission opening is opened in one of walls of the housing, and occupies 50% or more of the entire area of the wall with the transmission opening formed.

3. The ventilation duct set forth in claim 1, wherein the conduit comprises a communication opening communicating the ventilation opening of the duct body with the inside of the vehicle passenger room, formed as a slit, having an opening periphery and a louver disposed in the opening periphery, the louver covering the communication opening permeably.

4. The ventilation duct set forth in claim 1 further comprising a sound absorption member disposed on one of inner surfaces of the conduit.

* * * * *